Feb. 18, 1930.  W. PANNWITZ  1,747,947
HANDPIECE FOR DENTAL PURPOSES
Filed July 23, 1928   2 Sheets-Sheet 1
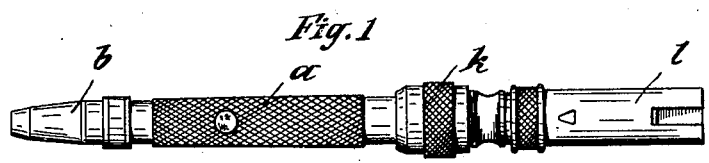
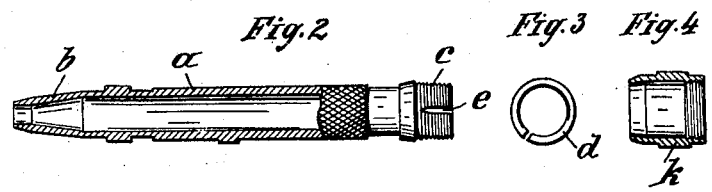 
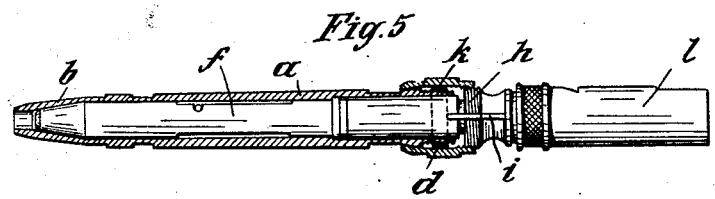
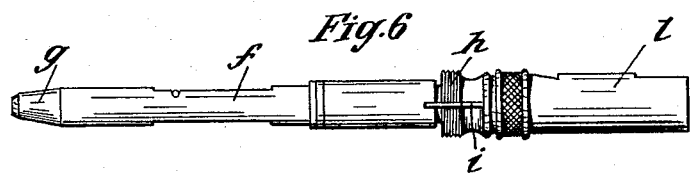
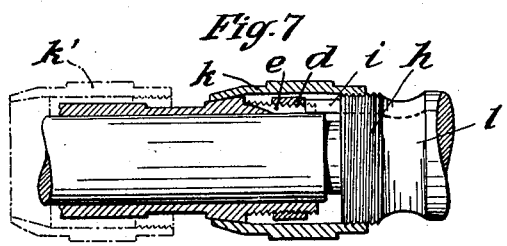

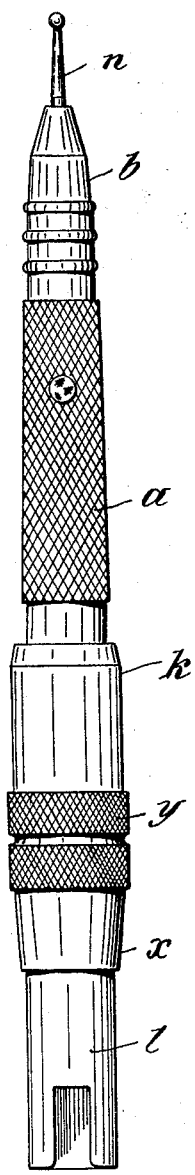
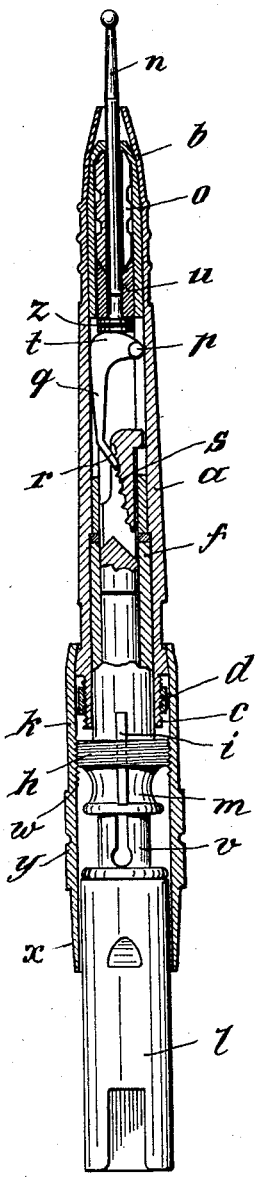
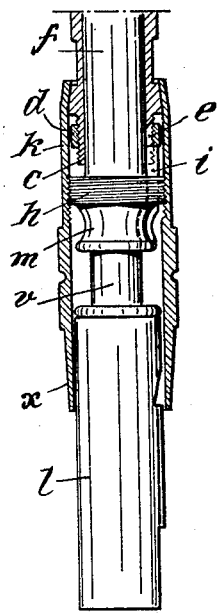

Patented Feb. 18, 1930

1,747,947

UNITED STATES PATENT OFFICE

WILHELM PANNWITZ, OF BERLIN-COPENICK, GERMANY, ASSIGNOR TO DEUTSCHE GOLD- UND SILBERSCHEIDEANSTALT, OF FRANKFORT-ON-THE-MAIN, GERMANY

HANDPIECE FOR DENTAL PURPOSES

Application filed July 23, 1928. Serial No. 294,892.

This invention, which has been partly described in my prior application Serial No. 208,649 filed July 26, 1927, relates to hand supported dental tools, which usually comprise a tool holder adjustably mounted in a casing and adapted to be driven when necessary by suitable driving means.

The tool holder usually has a slightly conical forward end bearing in the correspondingly shaped front of the casing, and is adjusted by means of a pin-shaped screw situated at the rear end of the casing with its axis parallel to the axis of the casing, a flange or projection on the tool holder limiting the forward movement thereof.

The manipulation of this device in the adjustment of the screw is always tedious, as the casing must be removed entirely and a special screw driver be used. The small and delicate screw is easily damaged so that it no longer fits in the corresponding recesses in the flange of the tool holder.

The object of the invention is to avoid the above difficulties, in other words to render the hand dental tool simpler and easier to manipulate.

According to the invention the adjustment of the tool holder in the casing is limited by a member for instance a screw threaded ring or the like, on or in the casing, which can be rotated about the axis of the casing, preferably concentrically in relation thereto.

Two forms of a hand-tool according to the invention are illustrated in the accompanying drawings, wherein Figure 1 is an outside view of the complete tool, Figure 2 is a part sectional view of the casing, Figures 3 and 4 are, respectively, an end view of the adjusting ring and a side sectional view of the nut, Figure 5 is a side sectional view corresponding to Fig. 1, Figure 6 is a side view of the hand tool with the nut and casing removed, Figure 7 shows on an enlarged scale the parts which control the position of the tool carrier, Figure 8 shows the second form of the hand tool in elevation, Figure 9 shows a partial section of Fig. 8, Figure 10 shows a detail partially in section.

In the form illustrated in Figs. 1–7 the casing $a$, which has at its forward end an internal conical bearing face $b$, is provided at its rear with a screw thread $c$, upon which an internally screw threaded ring $d$ or the like can be adjusted. The screw threaded part $c$ has a slot $e$.

The tool holder $f$, which is driven in the ordinary manner (not illustrated) is conical at its forward end similar to the bearing face $b$. It rotates in the casing, a portion of it extending, for example, into the sliding connecting sleeve $l$. The latter is provided with a screw threaded part $h$ and also with a rib $i$ which is disposed in the axial direction of the tool holder $f$ and fits into the slot $e$ of the screw threaded part $c$ of the casing $a$. The sleeve $l$ and the casing $a$ are connected together by a nut $k$ surrounding the casing and screwing on the thread of the sleeve $l$. The nut $k$ is advantageously of a diameter which is not substantially greater than that of the part $a$ of the casing so that the tool lies comfortably in the hand during use.

In the form illustrated in Figures 8–10 the sleeve $a$ of the hand piece having the front cone $b$ is provided at the rear end with a screw thread $c$ on which is axially seated the screwed ring $d$. In the portion of the sleeve $a$ of the hand piece provided with the screw thread $c$ is provided a slot $e$ in which is guided a stop $i$ on the part $m$ of the handle sleeve, which in combination with the screwed ring $d$ adjusts the forward movement of the tool holder $f$ in the sleeve $a$ of the hand piece. The part $m$ of the handle sleeve and the sleeve $a$ of the hand piece are connected together by an external nut $k$ which is screwed on the screw thread $k$ of the part $m$ of the handle sleeve to such an extent as is permitted by the stop $i$ in combination with the screwed ring $d$.

The tool holder is of the construction usual in hand pieces. For clamping the tool $n$ in the clamping sleeve $o$ of the tool carrier $f$ there is provided a cam lever $q$, pivoted at $p$, on the lower end $r$ of which acts a wedge shaped rack $s$. By tilting the lever $q$, which is effected by axially moving the wedge shaped rack $s$, the cam $t$ operates through the medium of an intermediate member $z$ on a clamping member $u$ of which the forward movement is effected by the lever position according to the clamping or unclamping of the tool $n$ in the clamping sleeve $o$. The rack $s$ is connected to a sliding part $v$ of the handle sleeve $l$ and can be withdrawn axially from the hand piece.

In order that the operator using the tool is not injured or does not become soiled when the sliding part $v$ is withdrawn from the sleeve $h$ of the hand piece, for removing the tool $n$, the external nut $k$ is extended to such a distance beyond the screw thread $w$ that the sliding part $v$ is also completely covered in the withdrawn position by the extension $x$ of the external nut $k$. The ribbing or milling $v$ provided in the external nut for the application of a tool for the purpose of releasing the external nut $k$ from the handle sleeve portion $m$, is provided on this extension of the external nut itself so that the screw thread $w$ is not damaged when applying a tool.

The position of the tool holder $f$ in the casing $a$ is regulated in both cases as follows:

The nut $k$ is unscrewed from the thread $h$ and drawn back so far, that the ring $d$ is free. In Figure 7 the position of the drawn back nut $k'$ is indicated by the dotted lines. The ring $d$ is then screwed by hand into the desired position on the threaded part $c$ of the casing $a$, upon which position depends the position of the tool holder $f$ in the casing $a$, as the ring $d$ limits the forward movement of the rib $i$ solid with the sleeve $l$, pushing forward the tool holder $f$ into the casing $a$. When the tool holder $f$ has got the desired position in the casing $a$, the nut $k$ is drawn forward and screwed on the thread $h$ of the sleeve $l$.

I claim:

1. A hand piece for dental purposes comprising a casing, a sleeve removably secured to said casing, a tool holder rotatably arranged in said casing and said sleeve, a screw-thread on the end of said casing, an internally screw threaded ring axially movable on said screw-thread of said casing and a projection on said sleeve cooperating with said ring in order to limit the forward movement of said sleeve pushing said tool holder forward into said casing.

2. A hand piece for dental purposes comprising a casing, a sleeve removably secured to said casing, a tool holder rotatably arranged in said casing and said sleeve, a screw thread on the end of said casing, an internally screw-threaded ring axially movable on said screw-thread, a slot in said screw-threaded end of said casing, a rib entering said slot on said sleeve in order to limit the forward movement of said sleeve pushing said tool holder forward into said casing.

3. A hand piece for dental purposes comprising a casing, a nut axially movable on said casing, a screw-thread on the end of said casing under said nut, an internally screw-threaded ring axially movable on said screw-thread, a sleeve connected to said casing by said nut, a tool holder in said casing and said sleeve and a rib on said sleeve cooperating with said ring, thereby limiting the forward movement of said sleeve pushing said tool holder into said casing.

4. A hand piece for dental purposes comprising a casing, a nut of only a slightly greater diameter than that of said casing axially movable on said casing, a screw-thread on the end of said casing under said nut, an internally screw-threaded ring axially movable on said screw-thread, a sleeve connected to said casing by said nut, a tool holder in said casing and said sleeve and a rib on said sleeve cooperating with said ring, thereby limiting the forward movement of said sleeve pushing said tool holder into said casing.

5. A hand piece for dental purposes comprising a casing, a nut axially movable on said casing, a screw thread on the end of said casing under said nut, an internally screw-threaded ring axially movable on said screw-thread, a sleeve connected to said casing by said nut, a tool holder in said sleeve and said casing, a rib on said sleeve cooperating with said ring, thereby limiting the forward movement of said sleeve pushing said tool holder into said casing, an axially and partially withdrawable clamping device in said tool holder and a tubular extension on said nut, covering said withdrawable part of the clamping device in the withdrawn position.

6. A hand piece for dental purposes comprising a casing, a nut axially movable on said casing, a screw-thread on the end of said casing under said nut, an internally screw-threaded ring axially movable on said screw-thread, a sleeve connected to said casing by said nut, a tool holder in said sleeve and said casing, a rib on said sleeve cooperating with said ring, thereby limiting the forward movement of said sleeve pushing said tool holder into said casing, an axially and partially withdrawable clamping device in said tool holder, a tubular extension on said nut and covering said withdrawable part of the clamping device in the withdrawn position and an external ribbing on said extension of said nut.

In testimony whereof I affix my signature.

WILHELM PANNWITZ.